(12) United States Patent
Kawaguchi

(10) Patent No.: US 11,487,134 B2
(45) Date of Patent: Nov. 1, 2022

(54) DISPLAY PROCESSING DEVICE, AND DISPLAY PROCESSING METHOD

(71) Applicant: AXELL CORPORATION, Tokyo (JP)

(72) Inventor: Hideyo Kawaguchi, Tokyo (JP)

(73) Assignee: Axell Corporation, Tokyo (JP)

( * ) Notice: Subject to any disclaimer, the term of this patent is extended or adjusted under 35 U.S.C. 154(b) by 47 days.

(21) Appl. No.: 16/987,088

(22) Filed: Aug. 6, 2020

(65) Prior Publication Data
US 2020/0363651 A1 Nov. 19, 2020

Related U.S. Application Data

(63) Continuation of application No. PCT/JP2018/040932, filed on Nov. 5, 2018.

(30) Foreign Application Priority Data

Apr. 6, 2018 (JP) .............................. JP2018-073711

(51) Int. Cl.
*G06T 11/60* (2006.01)
*G02B 30/52* (2020.01)

(52) U.S. Cl.
CPC .............. *G02B 30/52* (2020.01); *G06T 11/60* (2013.01)

(58) Field of Classification Search
CPC ................................. G02B 30/52; G06T 11/60
See application file for complete search history.

(56) References Cited

U.S. PATENT DOCUMENTS

2011/0074807 A1* 3/2011 Inada .................... G06T 11/001
345/589
2012/0075290 A1 3/2012 Kurosaki et al.
(Continued)

FOREIGN PATENT DOCUMENTS

JP H08292758 A 11/1996
JP H1021034 A 1/1998
(Continued)

OTHER PUBLICATIONS

WIPO, Japanese International Search Authority, International Search Report (with English translation) and Written Opinion dated Jan. 8, 2019 in International Patent Application No. PCT/JP2018/040932, 9 pages.

*Primary Examiner* — Alexander Eisen
*Assistant Examiner* — Cory A Almeida
(74) *Attorney, Agent, or Firm* — Masuvalley & Partners; Peter R. Martinez; James W. Inskeep, Esq.

(57) ABSTRACT

To provide a display processing device that displays the structure of a displayed item configured by stacking a plurality of displayed items in an understandable manner and enables easy confirmation of each of the layers being stacked and displayed. The display processing device includes a graduation-image display unit (a graduation-display processing unit) 24 causing a display device 15 to display a graduation image having values the number of which corresponds to the number of a plurality of image layers, a specification unit (a pointer-display processing unit) 25 causing a value on the graduation image to be specified, and a displayed-number determination unit (a number-of-displayed-layers determination processing unit) 26 determining the number of image layers that are to be stacked and displayed by the display device 15, among the plurality of image layers in accordance with the value on the graduation image specified by the specification unit 25.

8 Claims, 16 Drawing Sheets

(56) References Cited

U.S. PATENT DOCUMENTS

2013/0330021 A1* 12/2013 Bansal .................... G06T 11/60
382/309
2015/0346981 A1* 12/2015 Johnson .............. G06F 3/04847
345/419

FOREIGN PATENT DOCUMENTS

| JP | 2012-94111 A | 5/2012 |
| JP | 2012256254 A | 12/2012 |
| JP | 2013016144 A | 1/2013 |

* cited by examiner

DISPLAY PROCESSING DEVICE, AND DISPLAY PROCESSING METHOD

CROSS-REFERENCE TO RELATED APPLICATIONS

This application is a continuation application of International Application PCT/JP2018/040932 filed on Nov. 5, 2018, and designated U.S., which claims priority to Japanese Patent Application No. 2018-073711 filed Apr. 6, 2018, the entire contents of both of which are incorporated herein by reference.

FIELD

The embodiments discussed herein are related to a display processing device, and a display processing device.

BACKGROUND

In recent years, in a game machine such as a pachinko machine and a pachislot machine, visual effects using visual effect images displayed on an image display device are becoming more complicated.

As visual effect images displayed on a liquid crystal display device, a main image such as a background image and a motif image and various types of preview images that indicate a gaming result are displayed simultaneously, so that the visual effect images have a very complicated structure and configuration.

Further, also in game consoles other than game machines, video expressions are becoming more complicated. The improvement of the performance of game consoles has enabled high-speed processing of a large amount of images, so that objects presented on a screen are also dramatically increased. As a result, production of graphics for games involves great difficulties.

Therefore, in a supporting device for supporting creation of visual effect images displayed in game machines or graphics used in game consoles or the like, it is a common procedure to perform processing of creating an image to be displayed, by editing a plurality of layers containing various objects that constitute an image and by stacking and joining edited layers.

With such a supporting device, there is a problem that, for example, particularly when the number of layers to be processed is large, it becomes difficult to recognize the configuration of the layers. Therefore, there is required a method that enables the order of stacked layers, an object on each layer, and the like to be visually confirmed.

For example, in techniques disclosed in Japanese Patent Application Laid-open No. 2012-256254 and Japanese Patent Application Laid-open No. 2013-16144, stacked layers (a group of layers) are arranged and displayed in a 3D space, and a camera position (a viewpoint) is changed to positions above and below the group of layers and to positions on left and right thereof, thereby enabling the overall structure of the group of layers to be visually confirmed.

According to the supporting devices disclosed in these patent literatures, a user can edit an object on each layer while confirming the order of combinations of layers in a group of layers and the object on each layer.

SUMMARY

However, conventional methods have a problem that operations are complicated and it is difficult to find which direction the group of layers is viewed from unless transition of switching of the viewpoint is followed or to recognize how respective stacked layers are configured.

Further, as the number of layers is increased, it becomes more difficult to confirm the configuration of the objects in the respective layers and the stacking order of the layers.

In order to solve the above problems, the present invention provides a display processing device causing a display device to display an image that is a stack of a plurality of layers, the display processing device comprising: a graduation-image display unit causing the display device to display a graduation image having graduation values the number of which corresponds to the number of the plurality of layers; a specification unit causing a graduation value on the graduation image to be specified; and a displayed-number determination unit determining a displayed number that is the number of displayed layers among the plurality of layers in accordance with the graduation value on the graduation image specified by the specification unit, the displayed layers to be displayed on the display device while being stacked on each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be explained below in detail with reference to the accompanying drawings.

Figure 1:
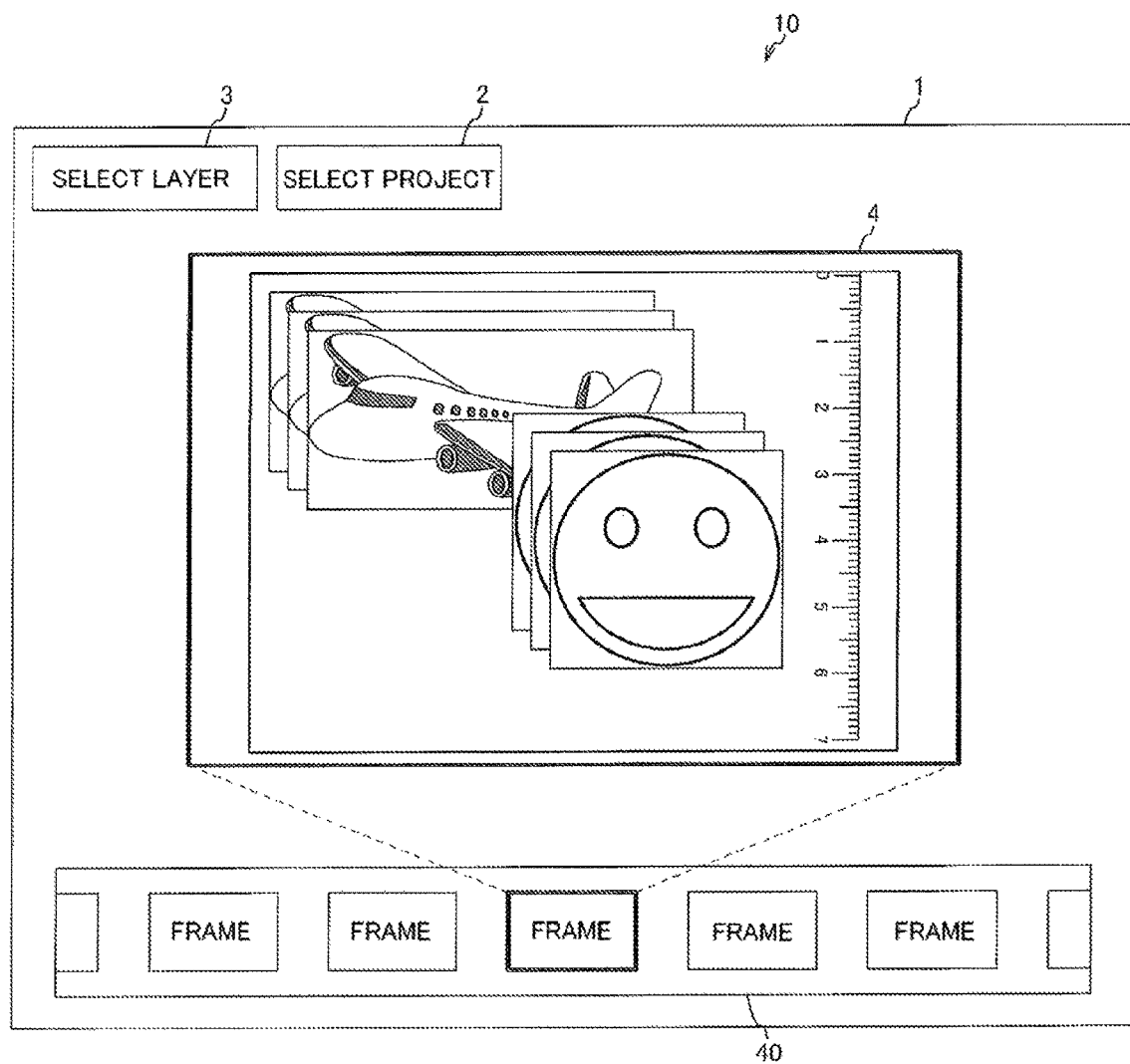
FIG. 1 is a diagram illustrating an image display screen in a display processing device according to an embodiment of the present invention.

FIG. 1 is a diagram illustrating an image display screen in a display processing device according to an embodiment of the present invention.

An image display screen 1 illustrated in FIG. 1 is displayed on a display device (a display) that is connected to a display processing device 10 according to the present embodiment.

The image display screen 1 includes a "project selection" button 2 for selecting edit data (referred to as "project data", as an example in the present embodiment) of a video containing frames containing a plurality of layers as data to be read, a frame display region 40 in which the frames contained in the read edit data are arranged and displayed in chronological order, a "layer selection" button 3 for selecting a layer to be displayed from a plurality of layers (image layers) that constitute a frame selected in the frame display region 40, and an image display region 4 for displaying an image in which selected layers to be displayed are stacked.

FIG. 1 illustrates a state in which a "project" button has been operated and therefore one unit of project data has been read, and a frame selected in the frame display region 40 is displayed in the image display region 4.

In a case where selection by the "layer selection" button 3 is not made, an image in which all layers constituting a frame are stacked is displayed in the image display region 4.

The display in FIG. 1 is merely an example, and in the display processing device 10 according to the present embodiment, when a video to be used in a game machine such as a pachinko machine and a pachislot machine or other game consoles is created, it is possible to easily confirm a layer structure and an object on a layer regarding an image of one unit constituting a video (a frame) in a method described below.

Further, in the display processing device 10 according to the present embodiment, it is possible to sequentially confirm a layer structure for each of frames contained in project data, by selecting a frame displayed in the frame display region 40 and displaying an image of the frame in the image display region 4.

It is needless to mention that, instead of using the display mode in FIG. 1, it is also possible to configure that data obtained by extracting one unit (one frame) from a video is prepared and, while the extracted data is sequentially read, the layer structure is confirmed by the method of the present embodiment.

One group of layers in the present specification is a group of layers constituting an image of one frame, for example, that constitutes a video to be displayed on an image display device.

Frames each formed by one group of layers are displayed successively (for example, at a rate of 60 frames per second), so that a continuous video is realized.

The display processing device 10 according to the present embodiment is a device that enables easy confirmation of a depth structure of a number of layers that constitute one frame, not one continuous video.

In order to confirm the structure as a whole of the video, a confirmation operation by the method of the present embodiment is performed frame by frame.

Further, the display processing device according to the present embodiment is a design supporting device that enables easy confirmation of the structure of layers of a frame constituting one continuous video, thereby contributing to support of designing a video used in game machines and game consoles.

It is also possible to configure that an editor tool (an image editing unit) included in the display processing device 10 is invoked to enable an image to be edited layer by layer or frame by frame.

Figure 2A:
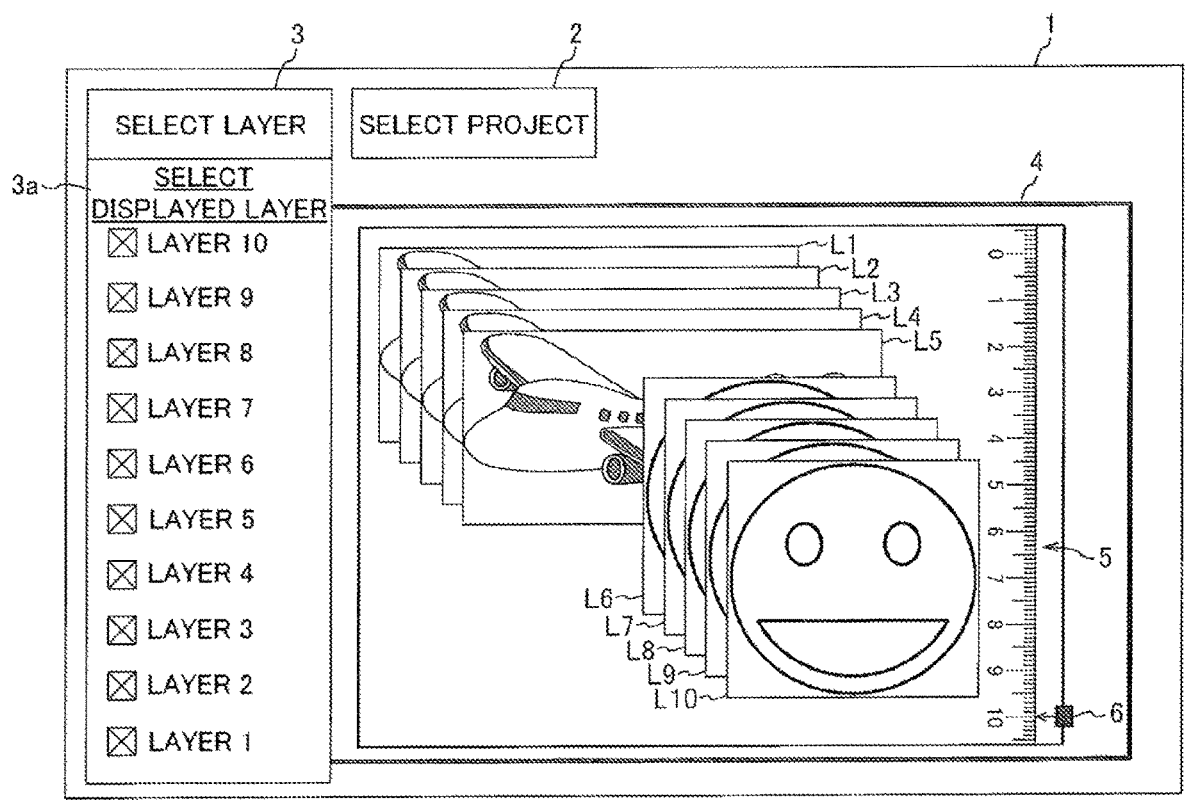
FIGS. 2A and 2B are diagrams illustrating a display in a case where a "layer selection" button has been operated on the image display screen illustrated in FIG. 1.
Figure 2B:
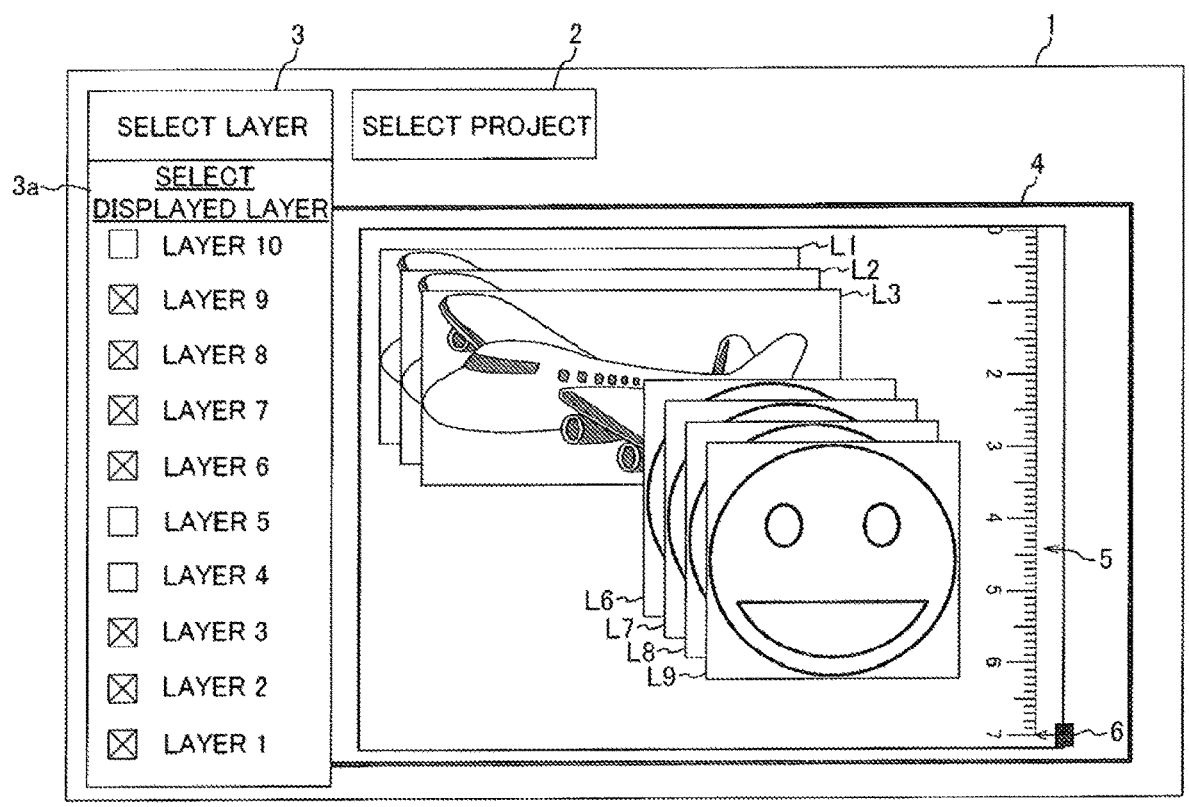

FIGS. 2A and 2B are diagrams illustrating a display in a case where a "layer selection" button has been operated on the image display screen illustrated in FIG. 1.

When the "layer selection" button 3 is selected (operated) by using an input unit such as a mouse, a drop-down list as a layer selection region 3a, for example, is displayed and a group of layers that constitute a frame currently displayed in the image display region 4 is displayed on a list.

The layer selection region 3a may be always displayed in the image display screen 1, not as the drop-down list displayed in accordance with a button operation. In this case, the "layer selection" button 3 is not required.

It is assumed that a read frame (a group of layers) is formed by ten layers, which are from a layer L1 that is the backmost layer to a layer L10 that is the frontmost layer as an example.

As illustrated in FIGS. 2A and 2B, for example, a checkbox is arranged for each layer in the layer selection region 3a, and it is possible to select for each layer whether to display the layer.

FIG. 2A illustrates a state of layer selection in an initial state (a state where a group of layers for one frame is read at first).

In the state illustrated in FIG. 2A, all the checkboxes are checked on the drop-down list 3a, and all the layers (the layers L1 to L10) are layers to be displayed.

As a result, an image in which all the layers L1 to L10 are stacked from the back side in this order is displayed in the image display region 4.

A user of the display processing device 10 according to the present embodiment can cause an image formed only by a layer or layers desired to be displayed to be displayed in the image display region 4 by unchecking the checkbox for a layer that is not to be displayed.

Alternatively, in the initial state (the state where the group of layers is read at first), it is possible to set that all the layers are layers to be hidden and all the checkboxes are unchecked.

In this case, the user of the display processing device 10 can cause an image formed only by a layer or layers desired to be displayed to be displayed in the image display region 4 by checking the checkbox for a layer that the user desires to display.

FIG. 2B illustrates a state of layer selection after selection made by a user.

In the state illustrated in FIG. 2B, on the drop-down list 3a as a layer selection region, checkboxes for the layer L4, the layer L5, and the layer L10 are unchecked and checkboxes for the layer L1, the layer L2, the layer L3, the layer L6, the layer L7, the layer L8, and the layer L9 are checked.

As a result, there is displayed an image in the image display region 4, in which all the layer L1, the layer L2, the layer L3, the layer L6, the layer L7, the layer L8, and the layer L9 are stacked from back to front in this order.

In the display processing device 10 according to the present embodiment, a scale-shaped graduation image 5 is included in or next to the image display region 4 of the image display screen 1.

This graduation image 5 has graduations the number of which corresponds to the number of layers in a read group of layers or the number of layers further selected from the read group of layers for being displayed.

For example, in a case where the number of layers selected in the checkboxes in FIG. 2A is "10", the graduations on the graduation image 5 are "0" to "10".

If the number of layers to be displayed is large, the number of the displayed graduations is also greatly increased. In this case, only a portion of the graduation image 5 may be displayed as described below (see FIGS. 5A to 5C).

In a case where the number of the layers selected in the checkboxes in FIG. 2B is "7", the graduations on the graduation image 5 are "0" to "7".

Further, a pointer image 6 for specifying a graduation value is displayed next to the graduation image 5.

In the display processing device 10 according to the present embodiment, layers the number of which corresponds to the graduation value indicated by the pointer image 6 on the graduation image 5 are displayed in the image display region 4.

As described below, by moving the pointer image 6 with respect to the graduation image 5 with a mouse operation or the like, it is possible to increase and decrease the number of layers to be displayed.

By sequentially performing operations of moving and displaying the pointer image 6 to gradually decrease or increase the number of displayed layers, it is possible to reproduce, in a screen, a work of stacking sheets of transparent celluloid paper on each of which an object (an image) is drawn and turning over the sheets of transparent celluloid paper one by one to confirm how the images are stacked.

As described above, the display processing device 10 according to the present embodiment causes a display device to display the graduation image 5 having a value corresponding to the number of stacked images (layers), and receives a specification of a graduation value on the graduation image 5. The display processing device 10 then causes the display device to arrange and display layers the number of which corresponds to the specified graduation value. With this configuration, it is possible to easily confirm each of the layers being stacked and displayed.

Particularly, the display processing device 10 according to the present embodiment causes the image display screen 1 (the display device) to display the same number of images as the specified graduation value on the graduation image 5 while the images are arranged in a front-back direction. With this configuration, the display processing device 10 performs display on the display device to make the order of layers and the number of graduations correspond to each other, so that it is possible to easily confirm each of the layers being stacked and displayed.

Further, the display processing device 10 according to the present embodiment causes the image display screen 1 (the display device) to display the pointer image 6 for specifying a graduation value on the graduation image 5.

The display processing device 10 then accepts movement and display of the pointer image 6 in accordance with an operation with an input device (an operation unit) such as a mouse, and accepts a specification of a graduation value on the graduation image 5 based on the position of the pointer image 6 with respect to the graduation image 5.

The display processing device 10 causes the display device to arrange and display images the number of which corresponds to the specified graduation value on the graduation image 5.

Therefore, it is possible to confirm each of the stacked and displayed layers more easily by an intuitive operation using a GUI (Graphics User Interface).

Further, the display processing device 10 according to the present embodiment stores therein a stacking order of layers as described later, and stacks the layers from the back (the layer on the back side) in accordance with the stored order. With this configuration, the display processing device 10 can express a relation in the front-back direction of the stacked layers, and enables easy confirmation of each of the layers that are stacked and displayed.

A display mode of a layer in accordance with movement of the pointer image 6 is described in detail.

FIGS. 3A to 4F are diagrams for explaining the number of displayed layers which is changed in accordance with movement of a pointer image.

Here, there is described a case in which seven layers are selected from a selected group of layers (frames), as layers to be displayed with an operation illustrated in FIG. 2B.

Figure 3A:
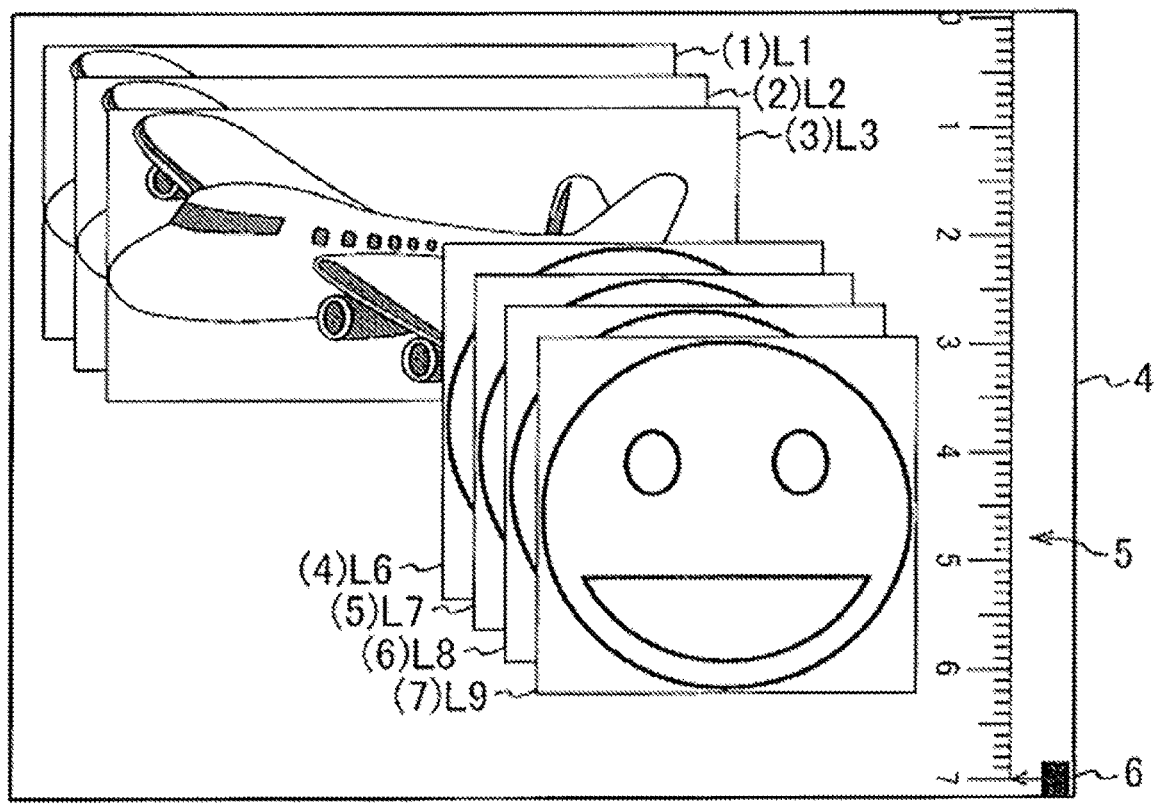
FIGS. 3A to 3C are diagrams for explaining the number of displayed layers which is changed in accordance with movement of a pointer image.

FIG. 3A illustrates an initial state in which the pointer image 6 is displayed at a position indicating a graduation value that is an integer (hereinafter, "integer value"), "7" on the graduation image 5. The integer value is a value indicating the number of layers to be displayed.

In this case, seven layers to be displayed are stacked and displayed from the bottom (from the back side) in order.

That is, there is displayed an image in the image display region 4, which is formed by the first layer L1, the second layer L2, the third layer L3, the fourth layer L6, the fifth layer L7, the sixth layer L8, and the seventh layer L9 from the back side to the front side (from bottom to top).

In FIGS. 3A to 4F, the layers are displayed while being displaced from each other for the sake of explanation. However, this displaying manner is not always necessary in practice, and it is a common procedure that layers of the same size are stacked and displayed. This is also true in the following descriptions.

Figure 3B:
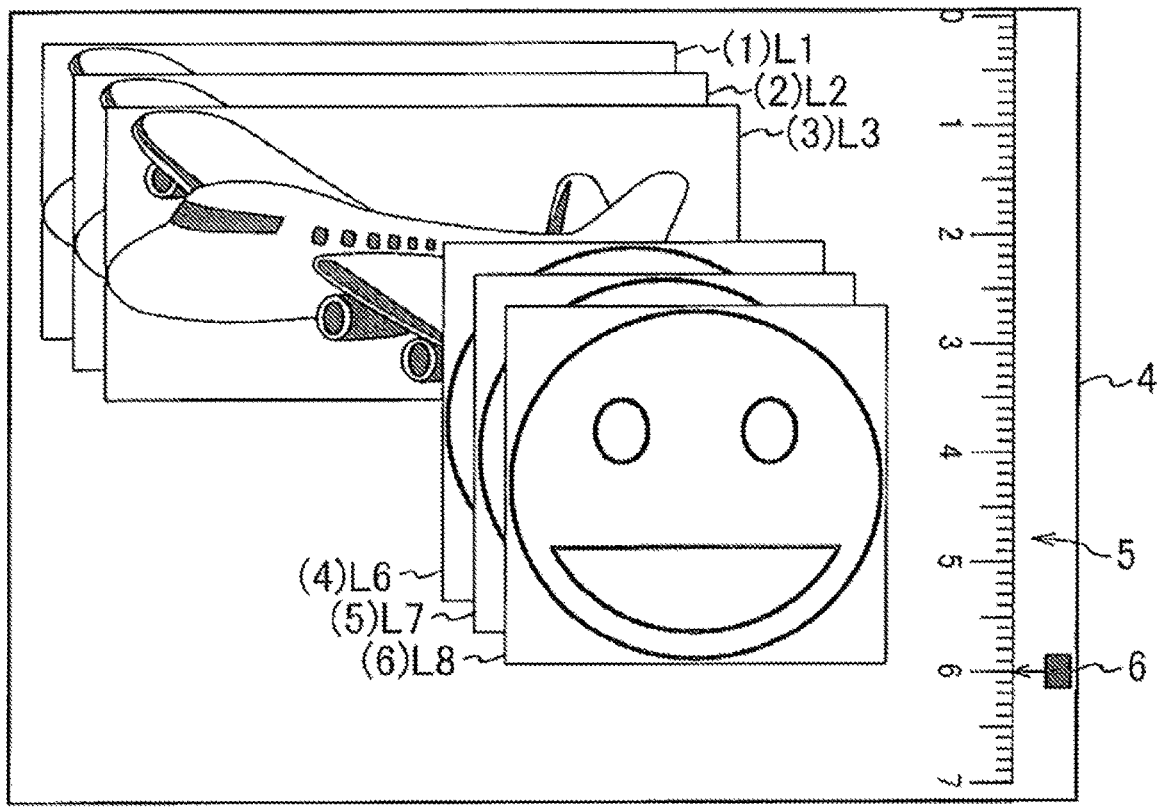

FIG. 3B illustrates a case where the displayed position of the pointer image 6 has been moved to the integer value "6" with a mouse operation or the like.

In this case, six layers to be displayed are stacked and displayed from the bottom (from the back side) in order.

That is, there is displayed an image in the image display region 4, which is formed by the first layer L1, the second layer L2, the third layer L3, the fourth layer L6, the fifth layer L7, and the sixth layer L8 from the back side to the front side (from bottom to top).

Figure 3C:
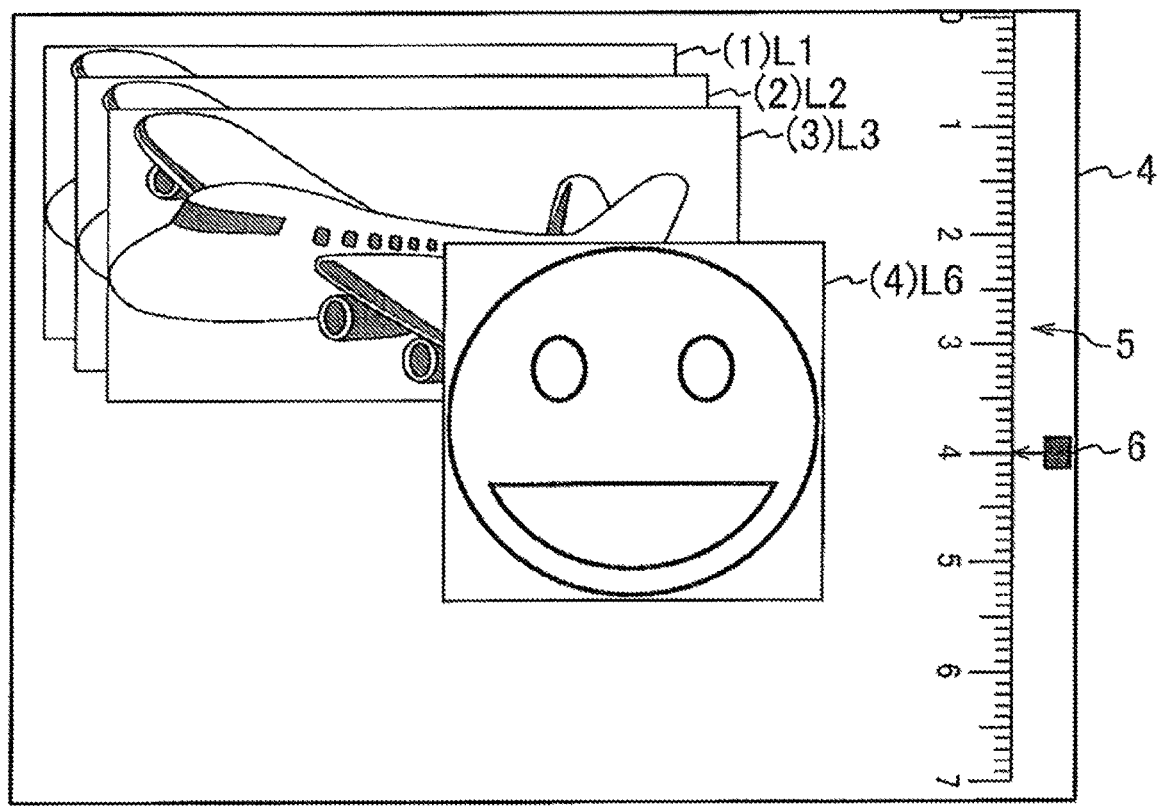

FIG. 3C illustrates a case where the displayed position of the pointer image 6 has been moved to the integer value "4" with a mouse operation or the like.

In this case, four layers to be displayed are stacked and displayed from the bottom (from the back side) in order.

That is, there is displayed an image in the image display region 4, which is formed by the first layer L1, the second layer L2, the third layer L3, and the fourth layer L6 from the back side to the front side (from bottom to top).

Figure 4D:
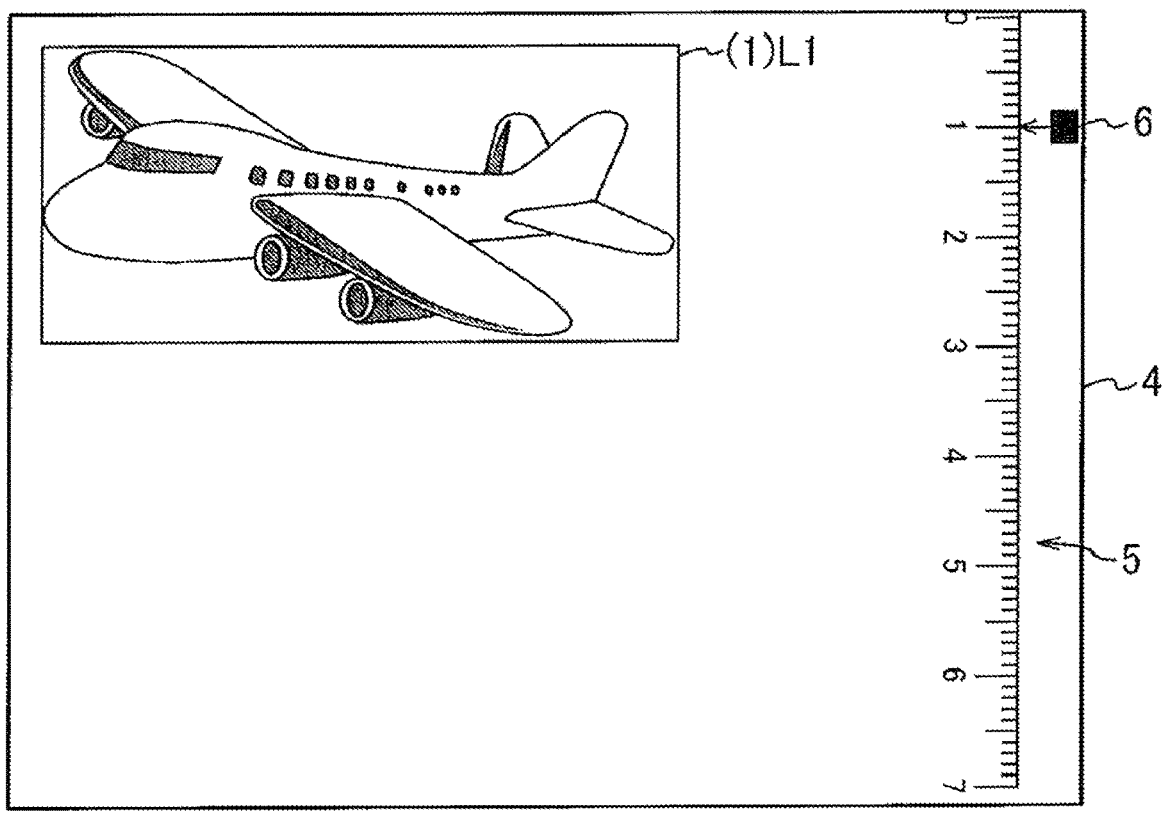
FIGS. 4D to 4F are diagrams for explaining the number of displayed layers which is changed in accordance with movement of a pointer image.

FIG. 4D illustrates a case where the displayed position of the pointer image 6 has been moved to the integer value "1" with a mouse operation or the like.

In this case, one layer to be displayed is displayed from the bottom (from the back side) in order.

That is, an image of the first layer L1 is displayed in the image display region 4.

Figure 4E:
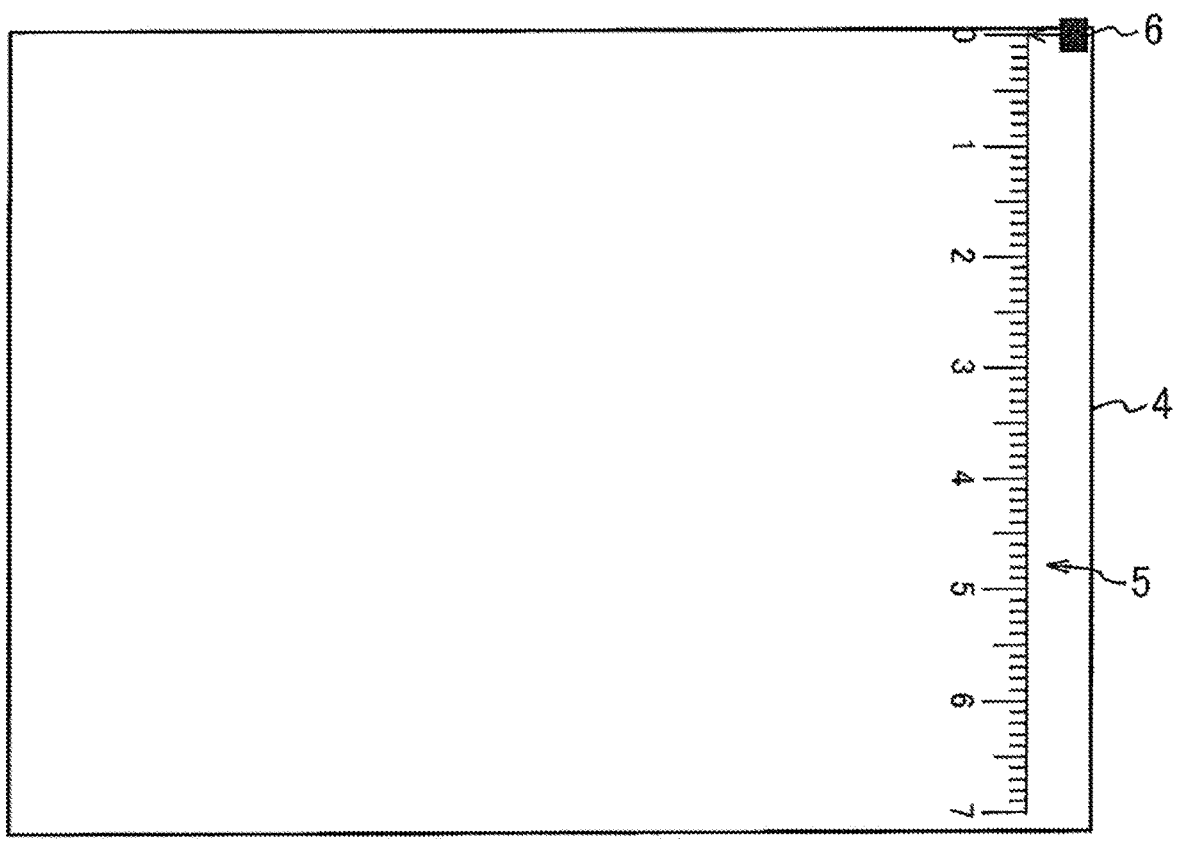

FIG. 4E illustrates a case where the displayed position of the pointer image 6 has been moved to a value "0" with a mouse operation or the like. In this case, there is no layer displayed in the image display region 4.

In the present embodiment, in a case where the pointer image 6 indicates a graduation value (a fractional value) between integer values, layers the number of which corresponds to a larger one of the integer values are stacked and displayed, and the frontmost one of the stacked layers is displayed in a transparent (translucent) manner.

In other words, layers the number of which corresponds to a smaller one of the integer values are stacked and displayed, and the next layer is displayed on the stacked layers in a transparent (translucent) manner.

Figure 4F:
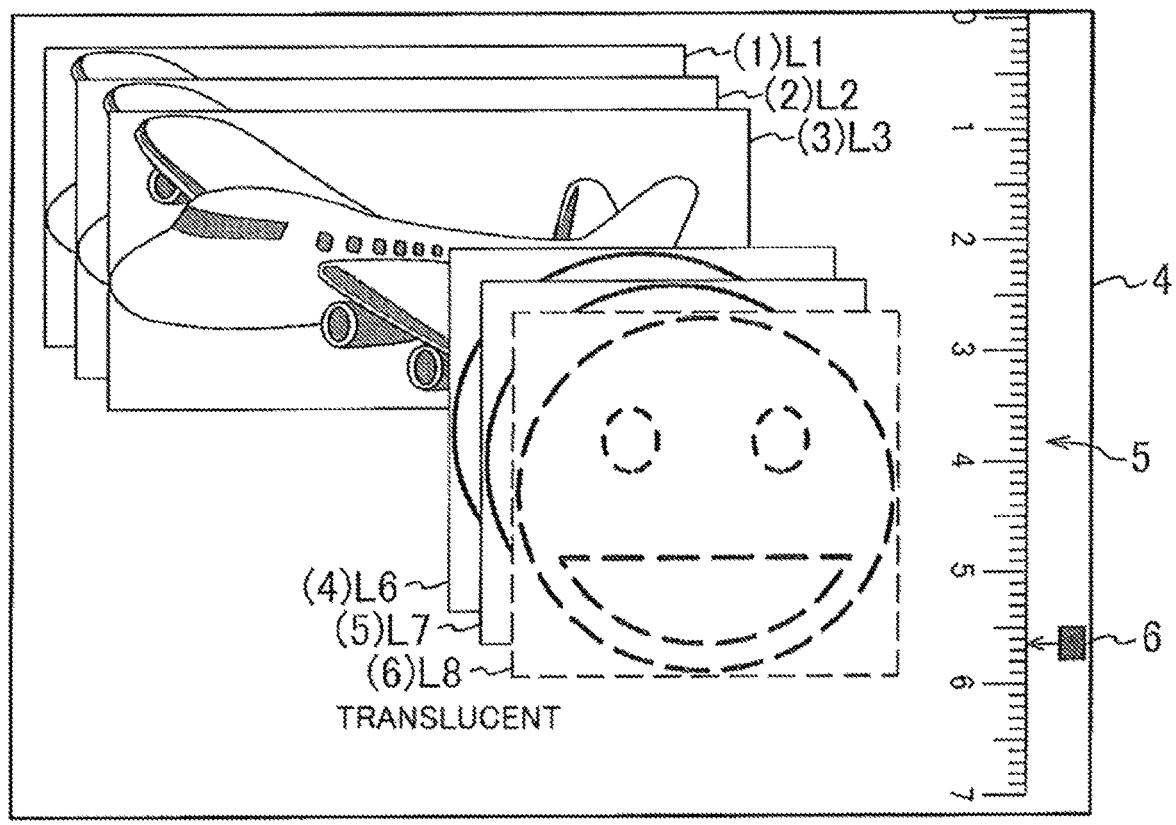

For example, in a case where the pointer image 6 indicates a graduation value between the integer value "5" and the integer value "6" as illustrated in FIG. 4F, the backmost layer to the fifth layer are stacked and displayed, and the sixth layer is displayed on the stacked layers in a transparent manner.

In addition, in a case where the pointer image 6 indicates a graduation value between "0" and the integer value "1", the first layer corresponding to the integer value "1" is displayed in a transparent (translucent) manner.

In a case where the pointer image 6 indicates a value between the integer value "1" and the integer value "2", the second layer is displayed in a translucent manner on the first layer.

In a case where the pointer image 6 indicates a value between the integer value "2" and the integer value "3", the first and second layers on the backmost side are stacked and displayed, and the third layer is displayed on the stacked layers in a transparent manner.

Further, in a case where the pointer image 6 indicates a graduation value between the integer value "3" and the integer value "4", the first to third layers on the backmost side are stacked and displayed, and the fourth layer is displayed on the stacked layers in a transparent manner.

In a case where the pointer image 6 indicates a graduation value between the integer value "4" and the integer value "5", the first to fourth layers on the backmost side are stacked and displayed, and the fifth layer is displayed on the stacked layers in a transparent manner.

In a case where the pointer image 6 indicates a graduation value between the integer value "6" and the integer value "7", the first to sixth layers on the backmost side are stacked and displayed, and the seventh layer is displayed on the stacked layers in a transparent manner.

As described above, when a graduation value is specified in unit smaller than a value indicating the number of displayed layers (in a case where a value (a fractional value) between graduation values each being an integer and indicating the number of displayed layers is specified), the display processing device 10 according to the present embodiment causes a display device to stack and display layers the number of which corresponds to a graduation value indicating the number of displayed layers larger than this specified value, and to also display the frontmost layer in a transparent manner.

With this configuration, according to the display processing device 10 of the present embodiment, it is possible to confirm stacked images by viewing each of them through the other, thereby enabling easy confirmation of each of the layers that are stacked and displayed.

The transparency of a (front-side) layer displayed in a transparent manner may be varied by a graduation value (a fraction value) between integer values indicated by the pointer image 6.

For example, in a case where the pointer image 6 indicates a graduation value between the integer value "6" and the integer value "7", it is possible to set the transparency to increase as the graduation value is closer to "6" and to decrease as the graduation value is closer to "7".

It is needless to mention that the transparency of the (front side) layer displayed in a transparent manner may be constant irrespective of a graduation value (a fraction value) between integer values indicated by the pointer image 6.

In a case where the pointer image 6 indicates a graduation value (a fractional value) between integer values, the pointer image 6 may be moved to a position indicating a closer one of the integer values without performing any translucent display.

Particularly, around an integer value, the pointer image 6 is moved to the position of the integer value (as if being attracted to the integer value) and is displayed at the position (magnet display).

For example, in a case where the pointer image 6 has been moved to a position indicating a value that is between the integer value "5" and the integer value "6" and is closer to "5" on the graduation image 5 with an operation, the pointer image 6 is moved to the position indicating the integer value "5" and is displayed at the position. On the other hand, in a case where the pointer image 6 has been moved to a position indicating a value that is between the integer value "5" and the integer value "6" and is closer to "6" on the graduation image 5 with an operation, the pointer image 6 is moved to the position indicating the integer value "6" and is displayed at the position.

In a case where the pointer image 6 indicates a middle position between integer values with an operation, as described above, a layer corresponding to a larger one of the integer values may be displayed in a transparent (translucent) manner.

In a case where a layer itself has been processed to be translucent, it is conceivable that the layer itself being translucent is confused with the processing of making a layer translucent in the present embodiment.

Control may be executed in such a manner that, in a case where layers to be displayed do not include any translucent layer, the processing of making a layer translucent in the present embodiment performed by indication of a graduation value between integer values is permitted, and in a case where layers to be displayed include a translucent layer, the processing of making a layer translucent is not performed (layers the number of which corresponds to integer values are stacked) when a graduation value between the integer values is indicated.

Figure 5A:
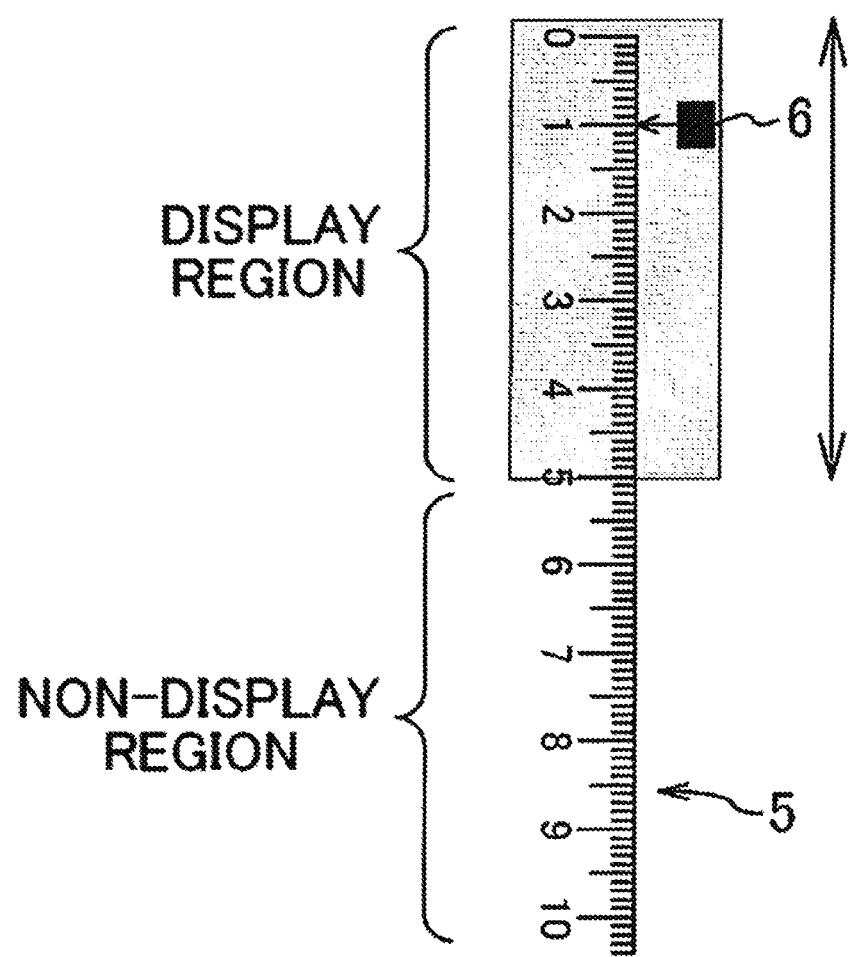
FIGS. 5A to 5C are diagrams illustrating display modes in a case where the number of layers to be displayed exceeds an upper limit of the number of graduations that can be displayed on a graduation image.
Figure 5B:
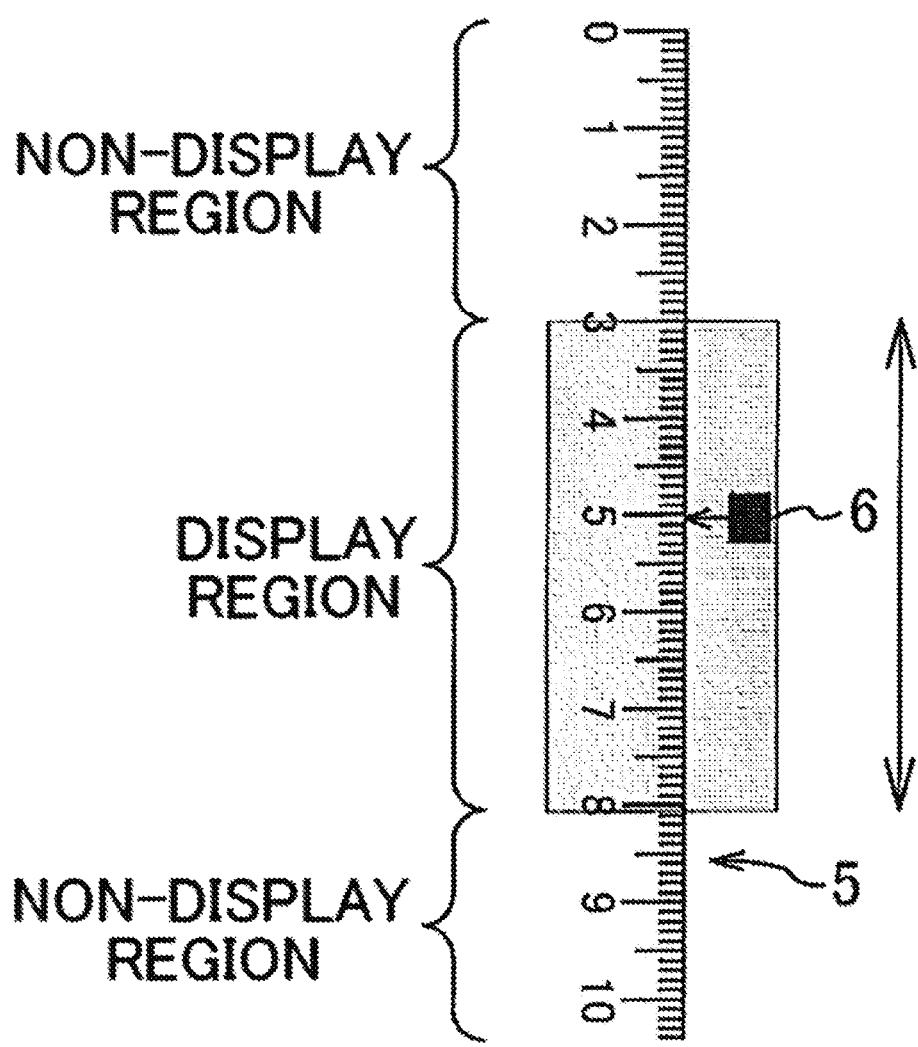
Figure 5C:
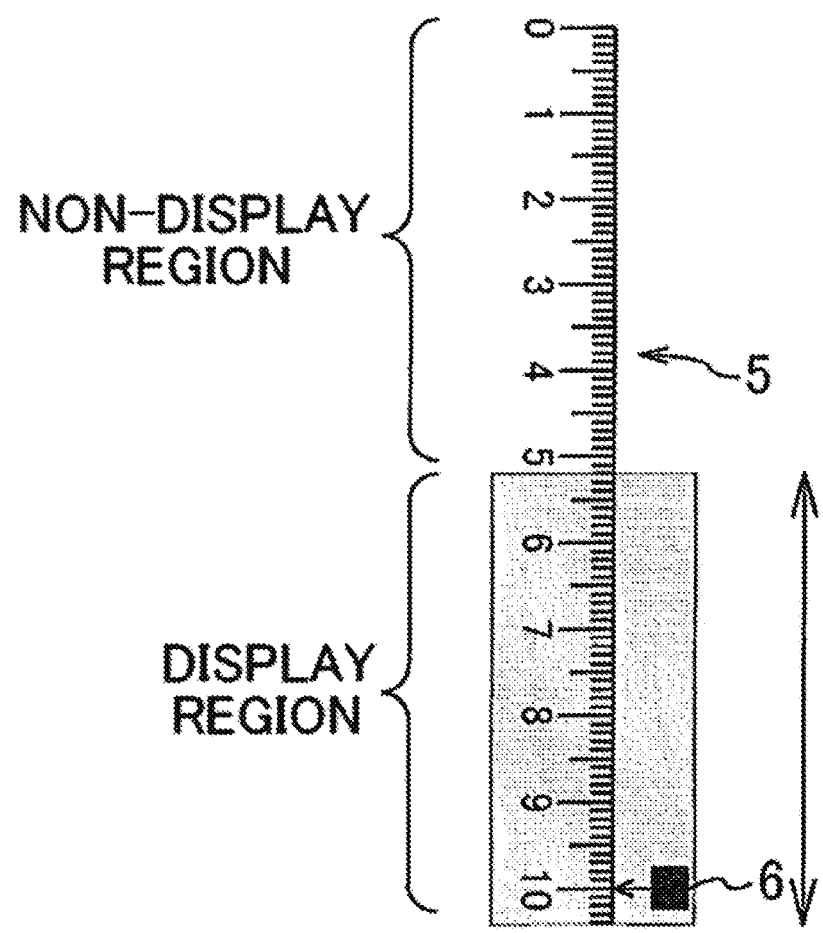

FIGS. 5A to 5C are diagrams illustrating display modes in a case where the number of layers to be displayed exceeds an upper limit of the number of graduations that can be displayed on a graduation image.

It is assumed that the upper limit of the number of graduations that can be displayed on the graduation image 5 is "5", and the number of layers to be displayed is "10".

The graduation image 5 substantially has graduations from "0" to "10" that include both a portion that can be displayed and a portion that cannot be displayed.

In this case, in initial display illustrated in FIG. 5A, "0" to "5" among the integer values from "0" to "10" are displayed on the graduation image 5. The integer values from "6" to "10" are hidden.

That is, a portion of the graduation image 5 including "0" to "5" is a display region and the other portion is a non-display region.

In this state, the pointer image 6 can be moved and displayed on the graduation image 5 from the graduation value "0" to the graduation value "5".

In a case where the pointer image 6 has been moved to a value after "5" which is hidden in FIG. 5A, display illustrated in FIG. 5B or 5C is made on the graduation image 5.

For example, as illustrated in FIG. 5B, graduation values from "3" to "8" are displayed on the graduation image 5. A value "0" to a graduation value smaller than "3" and a graduation value after "8" to a graduation value "10" are hidden.

That is, a portion of the graduation image 5 including "3" to "8" is a display region and the other portion is a non-display region.

In this state, the pointer image 6 can be moved and displayed from the graduation value "3" to the graduation value "8".

Alternatively, as illustrated in FIG. 5C, a graduation value after "5" to the graduation value "10" are displayed on the graduation image 5. The graduation values "0" to "5" are hidden.

That is, a portion of the graduation image 5 from the value after "5" to "10" is a display region and the other portion is a non-display region.

In this state, the pointer image 6 can be moved and displayed from the value after "5" to the graduation value "10".

As will be described below in detail, the display region is not changed as long as the pointer image 6 is moved within the display region of the graduation image 5 in FIG. 5A, 5B, or 5C.

However, in the state of FIG. 5A, for example, if the pointer image 6 is attempted to be moved beyond a lower limit of a movable range (to below the display region), the display region moves downward by the excess beyond the lower limit. The display region is scrolled and displayed while following the movement of the pointer image 6.

As a result of downward scrolling, the display region is placed in the state of FIG. 5B.

Since a new display region is set, the display region is not changed (is not scrolled) even if the pointer image 6 is moved up and down within the display region in FIG. 5B.

In the state of FIG. 5A, for example, even if the pointer image 6 is attempted to be moved beyond an upper limit of the movable range (to above the display region), the display region is not scrolled to be displayed because the uppermost portion of the graduation image 5 has been already displayed.

In the state of FIG. 5B, if the pointer image 6 is attempted to be moved beyond the lower limit of the movable range (to below the display region), the display region moves further downward by the excess beyond the lower limit. The display region is scrolled and displayed while following the movement of the pointer image 6.

Further, in the state of FIG. 5B, if the pointer image 6 is attempted to be moved beyond the upper limit of the movable range (to above the display region), the display region moves upward by the excess beyond the upper limit. That is, the display region is scrolled and displayed while following the movement of the pointer image 6.

When movement and display of the pointer image 6 beyond the upper limit of the movable range (to above the display region) are continued, the display returns to the state of FIG. 5A.

When movement and display of the pointer image 6 beyond the lower limit of the movable range (to below the display region) are continued, the display reaches the state of FIG. 5C.

If the pointer image 6 is attempted to be moved beyond the lower limit of the movable range (to below the display region) in the state of FIG. 5C, the display region is not scrolled to be displayed because the lowermost portion of the graduation image 5 has been already displayed.

In the state of FIG. 5C, if the pointer image 6 is attempted to be moved beyond the upper limit of the movable range (to above the display region), the display region moves upward by the excess beyond the upper limit. The display region is scrolled and displayed while following the movement of the pointer image 6, so that the display reaches the state of FIG. 5B.

As described above, the display processing device 10 according to the present embodiment causes a display device to display a portion of the graduation image 5 in accordance with the movement of the pointer image 6.

Therefore, in the display processing device 10, it is possible to easily specify a graduation value by enlarging and displaying the portion of the graduation image 5, even if the number of stacked layers is increased.

Figure 6A:
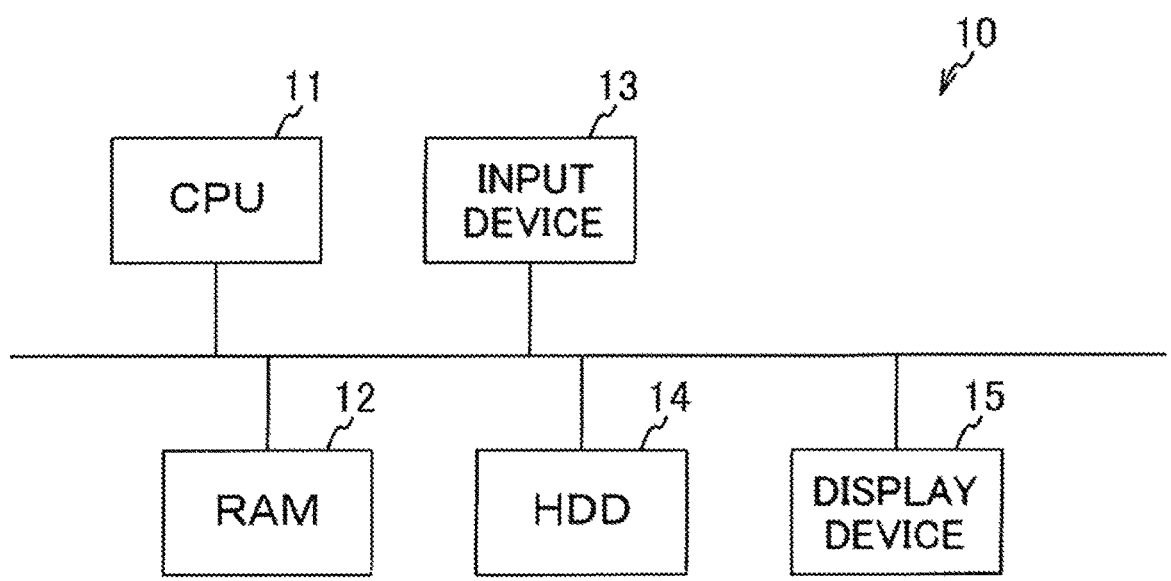
FIGS. 6A and 6B are diagrams illustrating a functional configuration of the display processing device according to the embodiment.
Figure 6B:
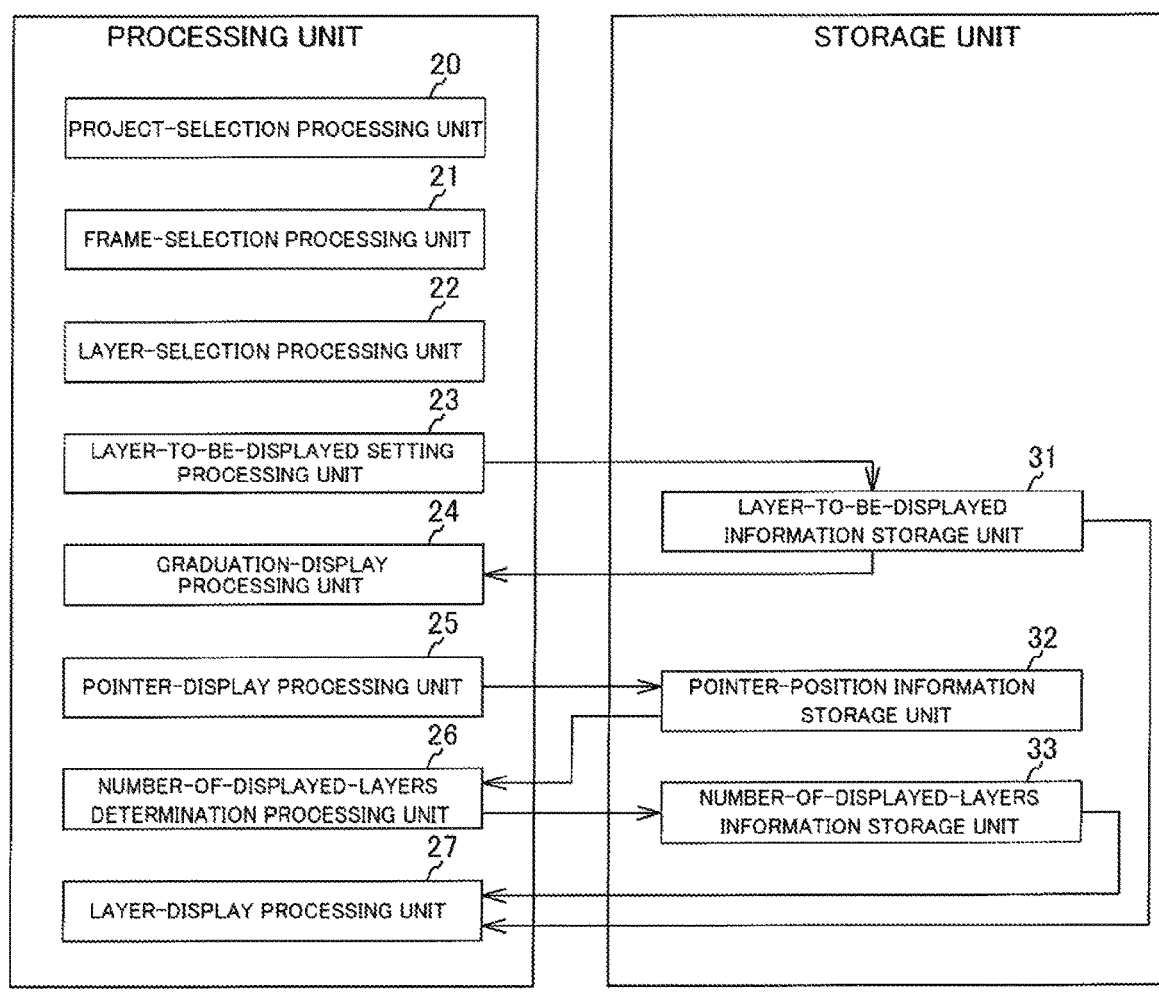

FIGS. 6A and 6B are diagrams illustrating a functional configuration of the display processing device 10 according to the present embodiment. FIG. 6A is a block diagram illustrating a hardware configuration, and FIG. 6B is a block diagram illustrating a functional configuration by software.

As illustrated in FIG. 6A, the display processing device 10 includes a processor such as a CPU (Central Processing Unit) 11 that executes a general-purpose operating system controlling the overall device and executes a program for realizing information distribution processing, a RAM (Random Access Memory) 12 on which various types of programs, temporary data, variables are loaded for processing performed by the CPU 11, an input device 13 such as a mouse, a keyboard, or a touch panel, a non-transitory computer-readable recording medium (nonvolatile computer readable recording medium) such as an HDD (Hard Disk Drive) 14 that stores programs and data therein, a ROM (Read Only Memory, not illustrated), and a display device 15, such as a liquid crystal display monitor. It is also possible to configure that the display processing device 10 does not include the display device 15, and is instead connected to an arbitrary display device 15.

Video data (project data) is stored in the HDD 14.

The display processing device 10 may include an SSD (Solid State Drive) or the like in place of the HDD 14.

It is needless to mention that the video data is stored in hardware other than the display processing device 10, and may be stored in a file server to which the display processing device 10 can be connected via a network.

The CPU 11 functions as a processing unit illustrated in FIG. 6B. The processing unit includes a project-selection processing unit 20, a frame-selection processing unit 21, a layer-selection processing unit 22, a layer-to-be-displayed setting processing unit 23, a graduation-display processing unit 24, a pointer-display processing unit 25, a number-of-displayed-layers determination processing unit 26, and a layer-display processing unit 27.

In a storage unit configured by the HDD 14 and the RAM 12, a layer-to-be-displayed information storage unit 31, a pointer-position information storage unit 32, and a number-of-displayed-layers information storage unit 33 are set.

Further, the HDD 14 can store therein one or more units of video data (project data) as edit data in which frames each containing a plurality of layers are arranged in chronological order, and the project data can be called and displayed on the display device 15 as necessary.

The project-selection processing unit 20 performs a process of displaying a dialog screen (not illustrated) for allowing a user to select project data stored in the HDD 14 as a portion of the image display screen 1 on the display device 15, and reading out the project data selected via the dialog screen to the RAM 12.

The frame-selection processing unit 21 displays, as a portion of the image display screen 1, the frame display region 40 in which frames contained in the read project data are displayed on a list, and when a frame is selected in the frame display region 40, the frame-selection processing unit 21 reads out the selected frame from the project data.

The layer-selection processing unit 22 performs a process of displaying, as a portion of the image display screen 1 on the display device 15, a dialog screen (for example, the drop-down list in FIG. 2) for allowing a user to select a layer to be displayed among layers contained in the frame read out to the RAM 12, and storing information on a selected checkbox in the RAM 12.

The layer-to-be-displayed setting processing unit 23 performs a process of storing information on the layer to be displayed in the layer-to-be-displayed information storage unit 31 set in the storage unit, based on the read frame and information selected by the layer-selection processing unit 22.

Information on a front-and-back relation (a stacking order) between layers to be displayed in a depth direction is also stored in the layer-to-be-displayed information storage unit 31.

If any selection of a layer to be displayed by the layer-selection processing unit 22 has not been made, the layer-to-be-displayed setting processing unit 23 performs a process of setting all layers included in a group of layers as the layers to be displayed. If selection by the layer-selection processing unit 22 has been made, the layer-to-be-displayed setting processing unit 23 performs a process of setting a layer or layers associated with this selection as the layer or layers to be displayed.

The graduation-display processing unit 24 performs a process of displaying, on the display device 15, the graduation image 5 having graduation values based on the number of the layers to be displayed based on the information on the layers to be displayed stored in the layer-to-be-displayed information storage unit 31.

The pointer-display processing unit 25 performs a process of displaying the pointer image 6 on the display device 15 in association with the graduation image 5.

Further, the pointer-display processing unit 25 moves and displays the pointer image 6 based on an operation using the input device 13 such as a mouse, and stores a graduation value on the graduation image 5 indicated by the pointer image 6 in the pointer-position information storage unit 32. The pointer-display processing unit 25 performs the process of displaying a pointer image and can also function as a specification unit that specifies a graduation value on a graduation image.

The number-of-displayed-layers determination processing unit 26 determines the number of actually displayed layers based on the graduation value on the graduation image 5 stored in the pointer-position information storage unit 32, and stores the determined number of displayed layers in the number-of-displayed-layers information storage unit 33.

The layer-display processing unit 27 performs a process of displaying a layer in accordance with the layers-to-be-displayed information stored in the layers-to-be-displayed information storage unit 31, in the image display region 4 on the display device 15, the number of the displayed layers corresponding to the number of displayed layers stored in the number-of-displayed layers information storage unit 33.

Figure 7:
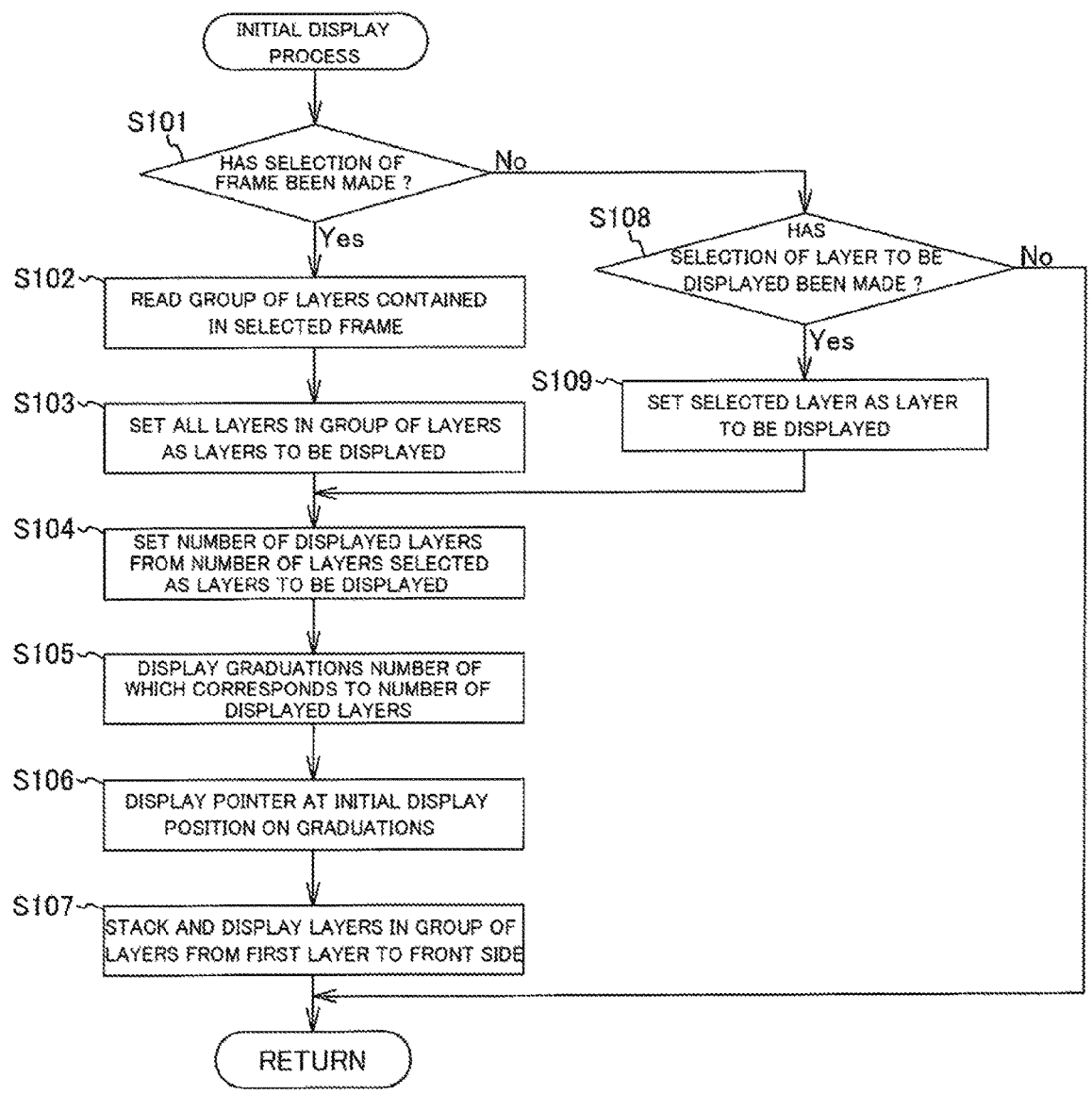
FIG. 7 is a flowchart for explaining an initial display process performed by a CPU of the display processing device according to the embodiment.

FIG. 7 is a flowchart for explaining an initial display process performed by a CPU of the display processing device according to the present embodiment.

It is assumed here that project data has been already read by the project-selection processing unit 20 and frames are expanded and displayed in the state illustrated in FIG. 1.

At Step S101, the CPU 11 (the frame-selection processing unit 21) determines whether one frame is selected in the frame display region 40 illustrated in FIG. 1.

When it is determined that selection has been made (Yes at Step S101), at Step S102, the CPU 11 (the frame-selection processing unit 21) reads data of the selected frame from the HDD 14 to the RAM 12.

Subsequently, at Step S103, the CPU 11 (the layer-to-be-displayed setting processing unit 23) then stores layer-to-be-displayed information in which all layers contained in the selected frame are set as layers to be displayed, in the layer-to-be-displayed information storage unit 31.

Subsequently, at Step S104, the CPU 11 (the number-of-displayed layers determination processing unit 26) sets the number of the layers set as the layers to be displayed, as number-of-displayed-layers information and stores the information in the number-of-displayed-layers information storage unit 33.

Subsequently, at Step S105, the CPU 11 (the graduation-display processing unit 24) displays graduations the number of which corresponds to the number of the displayed layers.

Further, at Step S106, the CPU 11 (the pointer-display processing unit 25) displays the pointer image 6 at an initial display position in the graduations.

The initial display position is the maximum graduation value on the graduation image 5, for example.

Subsequently, at Step S107, the CPU 11 (the layer-display processing unit 27) displays all the layers set as the layers to be displayed in the image display region 4, while stacking them in the order from the first layer on the backmost side to the front side.

When it is determined that no frame has been selected (No at Step S101), at Step S108, the CPU 11 (the layer-to-be-displayed setting processing unit 23) determines whether selection of a layer to be displayed using the layer selection region 3*a* has been made by the layer-selection processing unit 22.

If it is determined that selection of the layer to be displayed has been made (Yes at Step S108), at Step S109, the CPU 11 (the layer-to-be-displayed setting processing unit 23) stores layer-to-be-displayed information in which the selected layer is set as a layer to be displayed, in the layer-to-be-displayed information storage unit 31.

Thereafter, the CPU 11 performs the processes at Steps S104 to S107 based on the layer-to-be-displayed information. That is, the graduation image 5 having graduations the number of which corresponds to the number of the selected layers is displayed, the pointer image 6 is displayed at the initial display position, and the selected layers are stacked and displayed from the first layer to the front side.

If it is determined that any selection of a layer to be displayed has not been made (No at Step S108), the CPU 11 ends the processing without performing any process. Alternatively, the CPU 11 stands by for selection of a frame.

Figure 8:
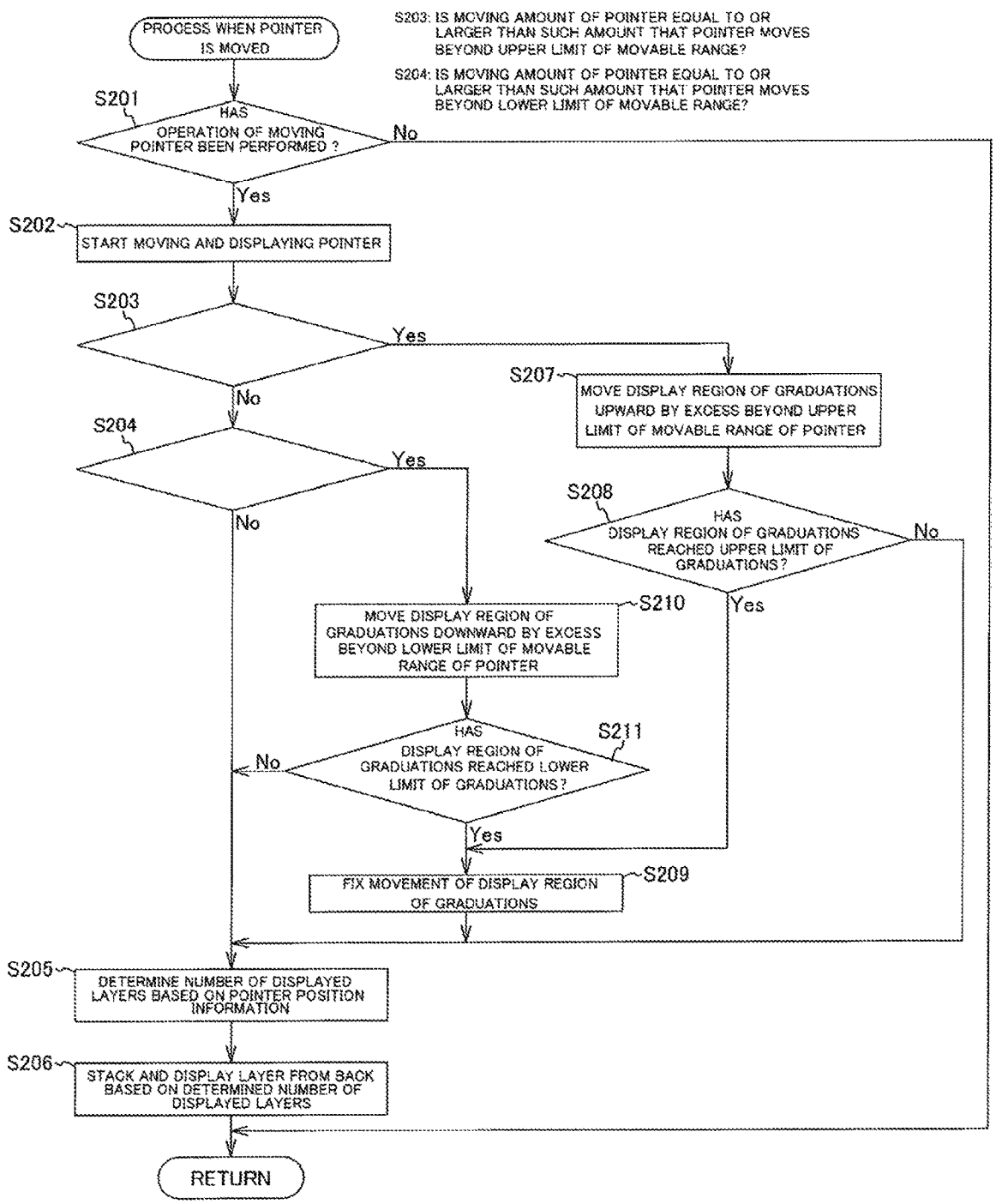
FIG. 8 is a flowchart for explaining a process when a pointer has been moved, performed by the CPU of the display processing device according to the embodiment.

FIG. 8 is a flowchart for explaining a process when a pointer has been moved, performed by a CPU of the display processing device according to the present embodiment.

As illustrated in FIGS. 3A to 4F, the display processing device 10 according to the present embodiment displays layers to be displayed while stacking them, the number of the layers to be displayed corresponding to a graduation value on the graduation image 5 indicated by the pointer image 6, in association with the movement of the pointer image 6.

In the graduation image 5, a portion is displayed (while being enlarged) as described with reference to FIGS. 5A to 5C, and the displayed region is varied in accordance with the movement of the pointer image 6.

At Step S201, the CPU 11 (the pointer-display processing unit 25) determines whether an operation of moving the pointer image 6 has been performed by the input device 13 such as a mouse.

If it is determined that any operation of moving the pointer image 6 has not been performed (No at Step S201), the CPU 11 (the pointer-display processing unit 25) ends the processing. Alternatively, the CPU 11 stands by for an operation of moving the pointer image 6.

If it is determined that the operation of moving the pointer image 6 has been performed (Yes at Step S201), at Step S202, the CPU 11 (the pointer-display processing unit 25) starts moving and displaying the pointer image 6 having followed the moving operation.

At Step S203, the CPU 11 (the graduation-display processing unit 24) then determines whether the moving amount of the pointer image 6 is equal to or larger than such an amount that the pointer image 6 moves beyond an upper limit of a movable range, that is, the movement of the pointer image 6 with an operation using a mouse or the like in an upward direction in FIGS. 2A to 3C has exceeded an upper limit of a display region of the graduation image 5 illustrated in FIGS. 5A to 5C.

If it is determined that the moving amount of the pointer image 6 is not equal to or larger than such an amount that the pointer image 6 moves beyond the upper limit of the movable range, that is, the destination of the movement of the pointer image 6 remains within the current display region of the graduation image 5 (No at Step S203), at Step S204, the CPU 11 (the graduation-display processing unit 24) determines whether the moving amount of the pointer image 6 is equal to or larger than such an amount that the pointer image 6 moves beyond a lower limit of the movable range, that is, the movement of the pointer image 6 with an operation using a mouse or the like in a downward direction in FIGS. 2A to 3C has exceeded a lower limit of the display region of the graduation image 5 illustrated in FIGS. 5A to 5C.

If it is determined that the moving amount of the pointer image 6 is not equal to or larger than such an amount that the pointer image 6 moves beyond the lower limit of the movable range, that is, the destination of the movement of the pointer image 6 remains within the current display region of the graduation image 5 illustrated in FIG. 5A, 5B, or 5C (No at Step S204), at Step S205, the CPU 11 (the number-of-displayed-layers determination processing unit 26) determines the number of displayed layers based on position information (a graduation value) of the pointer image 6 with respect to the graduation image 5 after the pointer image 6 has been moved within the display region.

At Step S206, the CPU 11 (the layer-display processing unit 27) then stacks and displays layers from the backmost side, based on the determined number of displayed layers.

At Step S203, if it is determined that the moving amount of the pointer image 6 is equal to or larger than such an amount that the pointer image 6 moves beyond the upper limit of the movable range, that is, the movement of the pointer image 6 has exceeded the upper limit of the display region of the graduation image 5 illustrated in FIGS. 5A to 5C (Yes at Step S203), at Step S207, the CPU 11 (the graduation-display processing unit 24) moves (shifts) the display region of the graduation image 5 upward by the excess of the moving amount of the pointer image 6 beyond the upper limit of the movable range (the display region).

That is, if the pointer image 6 is attempted to be moved and displayed beyond the current display region, the graduation image 5 follows the movement of the pointer image 6, is scrolled by the excess of the moving amount of the pointer image 6 beyond the display region, and is displayed.

At Step S208, the CPU 11 (the graduation-display processing unit 24) then determines whether the display region of the graduation image 5 has reached an upper limit of the graduation image 5.

If it is determined that the display region has reached the upper limit of the graduation image 5 (Yes at Step S208), at Step S209, the CPU 11 (the graduation-display processing unit 24) fixes the movement of the display region of the graduation image 5. The fixed state corresponds to the state of FIG. 5A.

At Step S205, the CPU 11 (the number-of-displayed-layers determination processing unit 26) then determines the number of displayed layers based on position information of the pointer image 6 with respect to the graduation image 5, and at Step S206, the CPU 11 (the layer-display processing unit 27) stacks and displays layers from the backmost side based on the determined number of displayed layers.

If it is determined that the display region has not reached the upper limit of the graduation image 5 as illustrated in FIG. 5B (No at Step S208), the CPU 11 (the number-of-displayed-layers determination processing unit 26) determines the number of displayed layers based on pointer position information of the pointer image 6 with respect to the graduation image 5 at Step S205, and at Step S206, the CPU 11 (the layer-display processing unit 27) stacks and displays layers from the backmost side based on the determined number of displayed layers.

At Step S204, if it is determined that the moving amount of the pointer image 6 is equal to or larger than such an amount that the pointer image 6 moves beyond the lower limit of the movable range, that is, the movement of the pointer image 6 has exceeded the lower limit of the display region of the graduation image 5 illustrated in FIGS. 5A to 5C (Yes at Step S204), at Step S210, the CPU 11 (the graduation-display processing unit 24) moves (shifts) the display region of the graduation image 5 downward by the excess of the moving amount of the pointer image 6 beyond the lower limit of the movable range (the display region).

That is, if the pointer image 6 is attempted to be moved and displayed beyond the current display region, the graduation image 5 follows the movement of the pointer image 6, is scrolled by the excess of the moving amount of the pointer image 6 beyond the display region, and is displayed.

At Step S211, the CPU 11 (the graduation-display processing unit 24) then determines whether the display region of the graduation image 5 has reached a lower limit of the graduation image 5.

At Step S209, if it is determined that the display region has reached the lower limit of the graduation image 5 (Yes at Step S211), the CPU 11 (the graduation-display processing unit 24) fixes the movement of the display region of the graduation image 5. The fixed state corresponds to the state of FIG. 5C.

At Step S205, the CPU 11 (the number-of-displayed-layers determination processing unit 26) then determines the number of displayed layers based on pointer position information, and at Step S206, the CPU 11 (the layer-display processing unit 27) stacks and displays layers from the backmost side based on the determined number of displayed layers.

If it is determined the display region has not reached the lower limit of the graduation image 5 as illustrated in FIG.

5B (No at Step S211), at Step S205, the CPU 11 (the number-of-displayed-layers determination processing unit 26) determines the number of displayed layers based on pointer position information of the pointer image 6 with respect to the graduation image 5, and at Step S206, the CPU 11 (the layer-display processing unit 27) stacks and displays layers from the backmost side based on the determined number of displayed layers.

With the above processes, the CPU 11 (the layer-display processing unit 27) changes the number of the displayed layers sequentially in accordance with the position information of the pointer image 6 with respect to the graduation image 5 that is successively output in accordance with the movement of the pointer image 6.

When being used as a previewer for a two-dimensional video, the display processing device 10 according to the present embodiment can display the layer configuration of the two-dimensional video in an understandable manner.

Further, when being used as a previewer for a three-dimensional model, the display processing device 10 according to the present embodiment can display the configuration for each three-dimensional model in an understandable manner.

The graduation image 5 is not limited to the illustrated ones, and can be a mode that is long in a lateral direction.

Further, the graduation image 5 is not limited to the illustrated scale-shaped image, and can be a dial-shaped image. In the case of a dial-shaped image, a user performs an operation of turning a dial by using the input device 13 such as a mouse, thereby being able to change the number of displayed layers.

The image on a layer may be a still image or (a frame of) a video.

In FIGS. 1 to 3C, although layers are displayed while being displaced from each other, this display method aims to explain stacking of the layers and the stacked layers, and is for convenience.

In practice, it is not always necessary that the layers are displayed while being displaced from each other as illustrated in FIGS. 1 to 3C.

Note that in a case of realizing the display processing device 10 according to the present embodiment, the layers may be displayed while being displaced from each other as illustrated in FIGS. 1 to 3C in order to display how the layers are stacked in a highlighted manner.

As described above, according to the display processing device of the present embodiment, regarding an image formed by a plurality of layers, it is possible to increase and decrease the number of displayed layers by moving and displaying a pointer image with respect to a graduation image.

By successively moving and displaying a pointer image, it is possible to easily confirm the layer structure of the image and an object on each layer with an operation feeling as if stacked images are browsed while being turned over one by one.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiments of the present invention have been described in detail, it should be understood that the various changes, substitutions, and alterations could be made hereto without departing from the spirit and scope of the invention.

What is claimed is:

1. A display processing device comprising:
a processor which executes a process including:
causing a display device to display an image that is a stack of a plurality of layers, and the display device to display a graduation image having graduation values the number of which corresponds to the number of the plurality of layers;
causing a graduation value on the graduation image to be specified; and
determining a displayed number that is the number of displayed layers among the plurality of layers in accordance with a graduation value on the graduation image specified by the causing to be specified, the displayed layers to be displayed on the display device while being stacked on each other, wherein
the causing to display performed by the processor further includes causing when a graduation value between graduation values each indicating the displayed number is specified, the display device to stack and display layers the number of which corresponds to one of the graduation values that shows the displayed number which is larger than the specified graduation value, and
to display a frontmost layer to be transparent, such that lower layer(s) can be visually recognized through an object on the frontmost layer, wherein
to perform a process of making the frontmost layer translucent in a case where layers to be displayed do not include any translucent layer and not to perform the process of making a layer translucent in a case where layers to be displayed include a translucent layer.

2. The display processing device according to claim 1, wherein
the process executed by the processor further includes:
causing the display device to display a pointer image that indicates any of the graduation values on the graduation image;
moving and displaying the pointer image in such a manner that the pointer image indicates a different graduation value on the graduation image in accordance with an operation performed by an operation unit; and
the causing to be specified performed by the processor further includes specifying a graduation value on the graduation image in accordance with the graduation value on the graduation image indicated by the pointer image.

3. The display processing device according to claim 2, wherein
the causing to display performed by the processor further includes causing the display device to display a region of a portion in the graduation image and to change the displayed region on the graduation image in accordance with movement and display of the pointer image with respect to the graduation image.

4. The display processing device according to claim 1, wherein
the causing to display performed by processor further includes causing the display device to display layers the number of which corresponds to the displayed number determined by the determining while stacking the layers from a back side to a front side.

5. The display processing device according to claim 4, further comprising:

a storage unit that stores therein a stacking order of the plurality of layers, wherein the causing to display performed by processor further includes stacking and displaying layers the number of which corresponds to the displayed number determined by the determining based on the stacking order.

6. The display processing device according to claim 1, wherein the process executed by the processor further includes:

causing a layer to be displayed to be selected from the plurality of layers;

the causing to display performed by processor further includes causing the display device to display a graduation image having values the number of which corresponds to the number of the layers to be displayed selected by the causing to be selected; and the determining performed by processor further includes determining how many layers among the layers to be displayed are stacked and displayed by the display device in accordance with a value on the graduation image specified by the causing to be specified.

7. A display processing method executed by a processor of a display processing device, wherein the processor executes a process comprising:

causing a display device to display an image that is a stack of a plurality of layers, and the display device to display a graduation image having graduation values the number of which corresponds to the number of the plurality of layers;

causing a graduation value on the graduation image to be specified; and determining a displayed number that is the number of displayed layers among the plurality of layers in accordance with a graduation value on the graduation image specified by the causing to be specified, the displayed layers to be displayed on the display device while being stacked on each other, wherein the causing to display performed by the processor further includes causing when a graduation value between graduation values each indicating the displayed number is specified, the display device to stack and display layers the number of which corresponds to one of the graduation values that shows the displayed number which is larger than the specified graduation value, and to display a frontmost layer to be transparent, such that lower layer(s) can be visually recognized through an object on the frontmost layer, wherein to perform a process of making the frontmost layer translucent in a case where layers to be displayed do not include any translucent layer and not to perform the process of making a layer translucent in a case where layers to be displayed include a translucent layer.

8. A non-transitory computer-readable recording medium having recorded therein a program for causing a processor of a display processing device to execute a displaying process, wherein the process comprises:

causing a display device to display an image that is a stack of a plurality of layers, and the display device to display a graduation image having graduation values the number of which corresponds to the number of the plurality of layers;

causing a graduation value on the graduation image to be specified; and determining a displayed number that is the number of displayed layers among the plurality of layers in accordance with a graduation value on the graduation image specified by the causing to be specified, the displayed layers to be displayed on the display device while being stacked on each other, wherein the causing to display performed by the processor further includes causing when a graduation value between graduation values each indicating the displayed number is specified, the display device to stack and display layers the number of which corresponds to one of the graduation values that shows the displayed number which is larger than the specified graduation value, and to display a frontmost layer to be transparent, such that lower layer(s) can be visually recognized through an object on the frontmost layer, wherein to perform a process of making the frontmost layer translucent in a case where layers to be displayed do not include any translucent layer and not to perform the process of making a layer translucent in a case where layers to be displayed include a translucent layer.

* * * * *